(12) United States Patent
Lifshitz et al.

(10) Patent No.: US 11,467,731 B2
(45) Date of Patent: Oct. 11, 2022

(54) CLIENT DRIVEN MULTI-SITE CONSISTENCY FOR OBJECT STORAGE

(71) Applicant: RED HAT, INC., Raleigh, NC (US)

(72) Inventors: Yuval Lifshitz, Ra'anana (IL); Casey Bodley, Ann Arbor, MI (US); Brett Niver, Westford, MA (US); Matthew Benjamin, Ann Arbor, MI (US)

(73) Assignee: RED HAT, INC., Raleigh, NC (US)

( * ) Notice: Subject to any disclaimer, the term of this patent is extended or adjusted under 35 U.S.C. 154(b) by 326 days.

(21) Appl. No.: 16/943,024

(22) Filed: Jul. 30, 2020

(65) Prior Publication Data
US 2022/0035726 A1 Feb. 3, 2022

(51) Int. Cl.
| G06F 12/00 | (2006.01) |
| G06F 3/06 | (2006.01) |
| G06F 11/34 | (2006.01) |
| G06F 11/30 | (2006.01) |
| G06F 9/50 | (2006.01) |
| G06F 9/54 | (2006.01) |

(52) U.S. Cl.
CPC ............ *G06F 3/0605* (2013.01); *G06F 3/065* (2013.01); *G06F 3/067* (2013.01); *G06F 3/0617* (2013.01); *G06F 9/5016* (2013.01); *G06F 9/542* (2013.01); *G06F 11/3034* (2013.01); *G06F 11/3414* (2013.01); *G06F 11/3466* (2013.01)

(58) Field of Classification Search
None
See application file for complete search history.

(56) References Cited

U.S. PATENT DOCUMENTS

| 7,577,960 B2 | 8/2009 | Steere et al. |
| 2019/0114287 A1 | 4/2019 | Xu et al. |

OTHER PUBLICATIONS

"Configuring Amazon S3 Event Notifications". (Apr. 6, 2020). Amazon Simple Storage Service, 14 pages.
"Tiger Bridge Cloud 3.7". (Jan. 29, 2020). Tiger Technology, 94 pages.
"Red Hat Storage 3". (Apr. 6, 2020). Red Hat Customer Portal, 3 pages.
"Synchronizing Servers Using eSync", (Apr. 6, 2020). Ektron, webhelp.episerver.com, 11 pages.

*Primary Examiner* — Daniel D Tsui
(74) *Attorney, Agent, or Firm* — Womble Bond Dickinson (US) LLP

(57) ABSTRACT

A notification configuration associated with an object is received by a first host system from a client device. The notification configuration causes host systems to generate notifications for the client device upon storing the object at the host systems. The object is stored in a first memory of the first host system. The notification configuration is transmitted by the first host system to a second host system. The object is provided to the second host system, wherein the second host system is to transmit a notification to the client device upon storing the object at a second memory of the second host system.

20 Claims, 11 Drawing Sheets

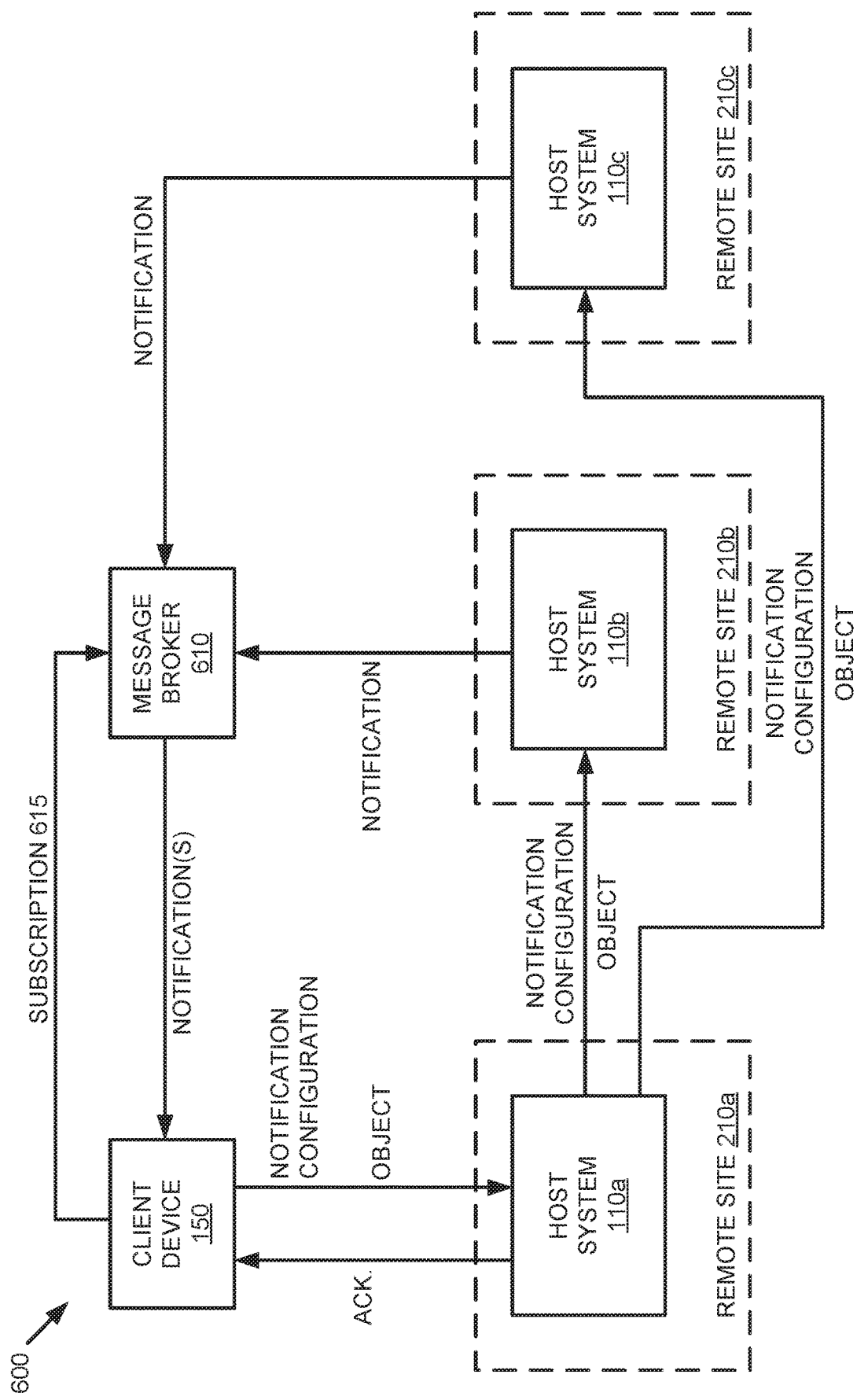

700

RECEIVE, BY A FIRST HOST SYSTEM, AN OBJECT AND A NOTIFICATION CONFIGURATION ASSOCIATED WITH THE OBJECT, WHEREIN THE NOTIFICATION CONFIGURATION CAUSES HOST SYSTEMS OF A GEO-REPLICATION SYSTEM TO TRANSMIT NOTIFICATIONS TO A MESSAGE BROKER UPON STORING THE OBJECT AT THE HOST SYSTEMS
710

TRANSMIT THE OBJECT AND THE NOTIFICATION CONFIGURATION TO A SECOND HOST SYSTEM, WHEREIN THE SECOND HOST SYSTEM IS TO TRANSMIT A NOTIFICATION TO THE MESSAGE BROKER UPON STORING THE OBJECT
720

FIG. 7

CLIENT DRIVEN MULTI-SITE CONSISTENCY FOR OBJECT STORAGE

TECHNICAL FIELD

Aspects of the present disclosure relate to a distributed storage system, and more particularly, to implementing client driven multi-site consistency for object storage.

BACKGROUND

A distributed storage system may include multiple host systems that are used for the storage of data, such as objects. To provide increased data resiliency, the host systems may be located at different remote sites at different geographic locations. Data may be replicated at the different remote sites to ensure the data is available if one or more remote sites are rendered inoperable.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 6 is an illustration of an example of a geo-replication system utilizing a message broker to distribute notifications, in accordance with embodiments of the disclosure.

FIG. 7 is a flow diagram of a method of a host system distributing a client generated notification configuration utilizing a message broker to a second host system, in accordance with some embodiments.

DETAILED DESCRIPTION

Figure 1:
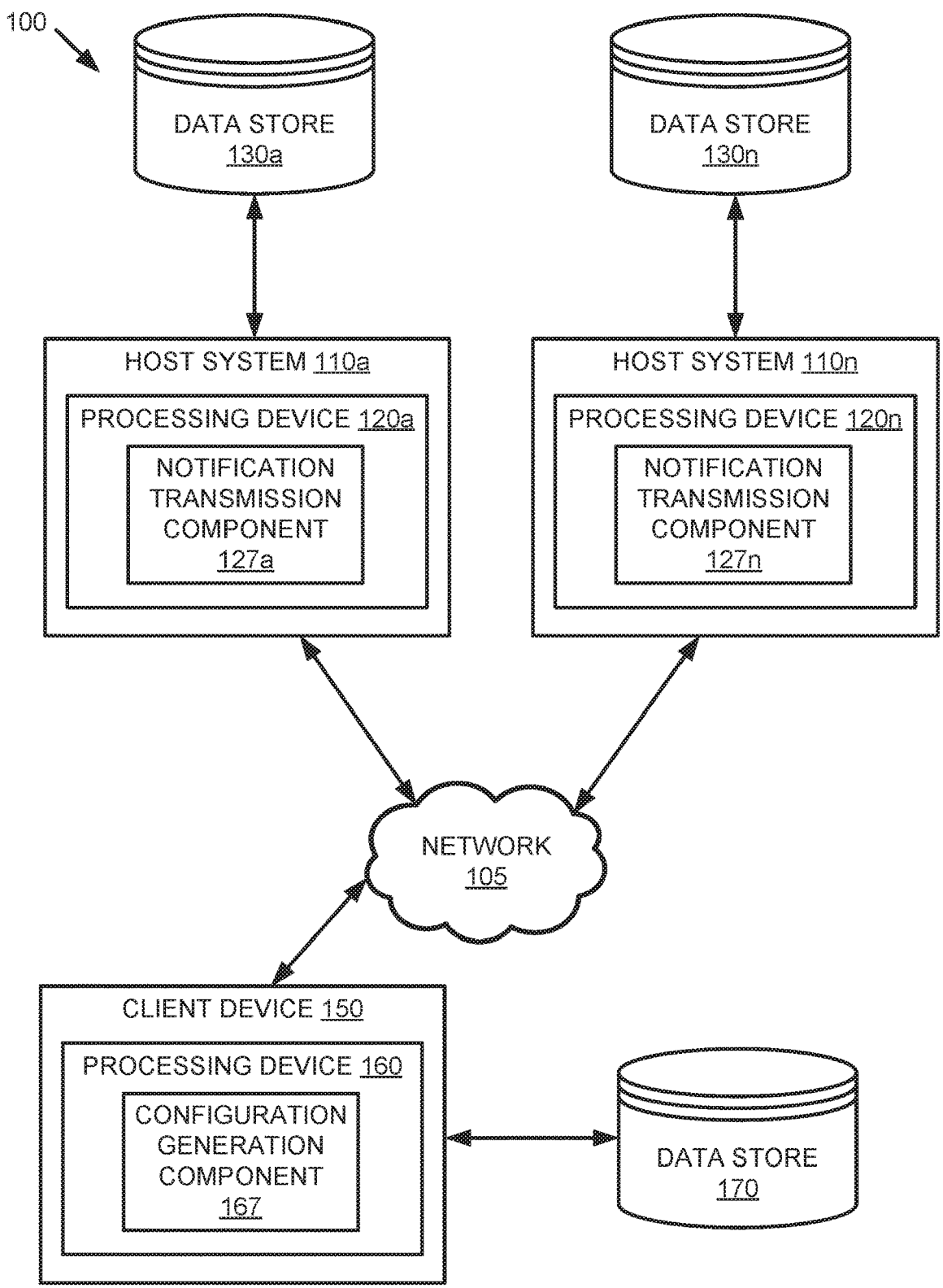
FIG. 1 is a block diagram that illustrates an example data center, in accordance with some embodiments.

In embodiments, a geo-replication system may be a distributed storage system that includes host systems at multiple remote sites that store data. One example method of storing data may be object storage. In object storage, rather than organizing files using a directory, object storage stores files/data in a flat organization of containers (also referred to as "buckets" hereafter) and use unique identifiers to access the files.

To provide increased data resiliency, the geo-replication system may use geographic redundancy to store the data across different remote sites at different geographic locations. Storing the data across different remote sites may provide for a greater redundancy than replicating the data locally at the same remote site, allowing the data to remain accessible should one or more remote sites be rendered inoperable. For example, if data is replicated at a first remote site in Los Angeles and a second remote site in Austin and the Los Angeles remote site is rendered inoperable by an earthquake, power outage, etc., the data may still be accessed at the Austin remote site.

One issue for users is determining whether objects provided to geo-replication system are safely stored at one or more host systems of remote sites of the geo-replication system. For example, a user may wish to know that the objects provided to a geo-replication system are stored and stable (e.g., is resilient against some hardware and/or power failures) at a number remote sites of the geo-replication system.

A conventional geo-replication system may use asynchronous replication of objects across different remote sites of the geo-replication system to mitigate the impacts on performance of the geo-replication system. In asynchronous replication, a first host system of the geo-replication system may receive an object from a user for storage. The first host system may provide an acknowledgment to the user that the data has been received, then replicate the data across remote sites as a background process. Rather than transmitting each individual object to other remote sites for storage, the host system may perform other actions on the object to avoid system slowdowns, such as grouping the object with other objects, compressing the object(s), etc., before transmitting the object(s) to the other remote sites of the geo-replication system. These additional actions may result in an increased amount of time before objects are replicated across the different remote sites of the geo-replication system.

Using an asynchronous replication process, however, means that a user may not be able to determine whether their data is actually safe and replicated across remote sites of the geo-replication system. For example, a user may provide an object to a host system of the geo-replication system and receive an acknowledgment that the data has been received, but minutes or hours may elapse before the object is safely stored across different sites of the geo-replication system as the host system waits for other objects to group with the object, compresses the object, etc.

Aspects of the disclosure address the above-noted and other deficiencies by utilizing a client driven notification system to monitor replication of an object across remote sites of a geo-replication system. A client device may generate a notification configuration that is associated with an object that is to be stored and replicated across remote sites of a geo-replication system. The notification configuration may cause a host system that receives and stores the object to transmit a notification indicating that the object has been stored at the host system. In embodiments, the notification configuration may include address information that indicates where the notification is to be sent to. For example, the notification configuration may include an internet protocol (IP) address for the client device and/or a message broker. Accordingly, the notification configuration may cause the host system to transmit a notification to the client device and/or message broker indicating that the object has been stored at the host system.

The notification configuration may be distributed prior to or in conjunction with the object to other host systems at different remote sites of the geo-replication system. As the host systems at the different remote sites receive the notification configuration and the object, each of the host systems may transmit a corresponding notification once the object has been stored at each of the host systems. These notifications may be monitored and used to determine which remote sites the object has been stored at and if any geo-redundancy/replication parameters for the object have been satisfied.

By having processing logic of a client device generate and provide a notification configuration that causes host systems of a geo-replication system to transmit notifications when the object is stored at respective host systems, a user may be able to quickly monitor and determine whether their data is safely stored and replicated at the geo-replication system. Furthermore, a user may be able to use the notifications to determine which remote sites the data is safely stored at.

FIG. 1 is a block diagram that illustrates an example system architecture 100, in accordance with some embodiments of the present disclosure. The system architecture 100 may include host systems 110a n and client device 150.

As illustrated in FIG. 1, system architecture 100 includes host systems 110a-n that include computing processing devices 120a-n and data stores 130a-n, respectively. Host systems 110a-n may correspond to any number of host systems of a geo-replication system. In embodiments, host systems 110a-n may be located at different remote sites of a geo-replication system, as will be described in further detail below.

The system architecture may also include a client device 150 that includes a computing processing device 160 and data store 170. The host systems 110a-n and client device 150 are coupled to each other (e.g., may be operatively coupled, communicatively coupled, may communicate data/messages with each other) via network 105. Network 105 may be a public network (e.g., the internet), a private network (e.g., a local area network (LAN) or wide area network (WAN)), or a combination thereof. In one embodiment, network 105 may include a wired or a wireless infrastructure, which may be provided by one or more wireless communications systems, such as a WiFi™ hotspot connected with the network 105 and/or a wireless carrier system that can be implemented using various data processing equipment, communication towers (e.g. cell towers), etc. The network 105 may carry communications (e.g., data, message, packets, frames, etc.) between the various components of host systems 110a-n.

The data stores 130a-n and 170 may be a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices.

Each component may include hardware such as processing devices (e.g., processors, central processing units (CPUs), memory (e.g., random access memory (RAM), storage devices (e.g., hard-disk drive (HDD), solid-state drive (SSD), etc.), and other hardware devices (e.g., sound card, video card, etc.). The host systems 110a-n and client device 150 may include any suitable type of computing device or machine that has a programmable processor including, for example, server computers, desktop computers, laptop computers, tablet computers, smartphones, set-top boxes, etc. In some examples, host systems 110a-n and client device 150 may comprise a single machine or may include multiple interconnected machines (e.g., multiple servers configured in a cluster). Host systems 110a-n and client device 150 may execute or include an operating system (OS), as discussed in more detail below. The OS of a server may manage the execution of other components (e.g., software, applications, etc.) and/or may manage access to the hardware (e.g., processors, memory, storage devices etc.) of the computing device.

In embodiments, processing devices 120a-n may execute notification transmission components 127a-n, respectively. The notification transmission components 127a-n may receive a notification configuration from client device 150. The notification transmission components 127a-n may also generate and transmit notifications in view of the information included in the notification configuration. For example, the notification transmission components 127a-n may generate notifications upon storage of the object associated with the notification configuration and transmit the notification to client device 150. In embodiments, processing device 160 may execute a configuration generation component 167. The configuration generation component 167 may generate a notification configuration for an object that causes host systems 110a-n to generate and transmit a notification upon storage of the object. Further details regarding notification transmission components 127a-n and configuration generation component 167 will be discussed at FIGS. 2-9 below.

Figure 2A:
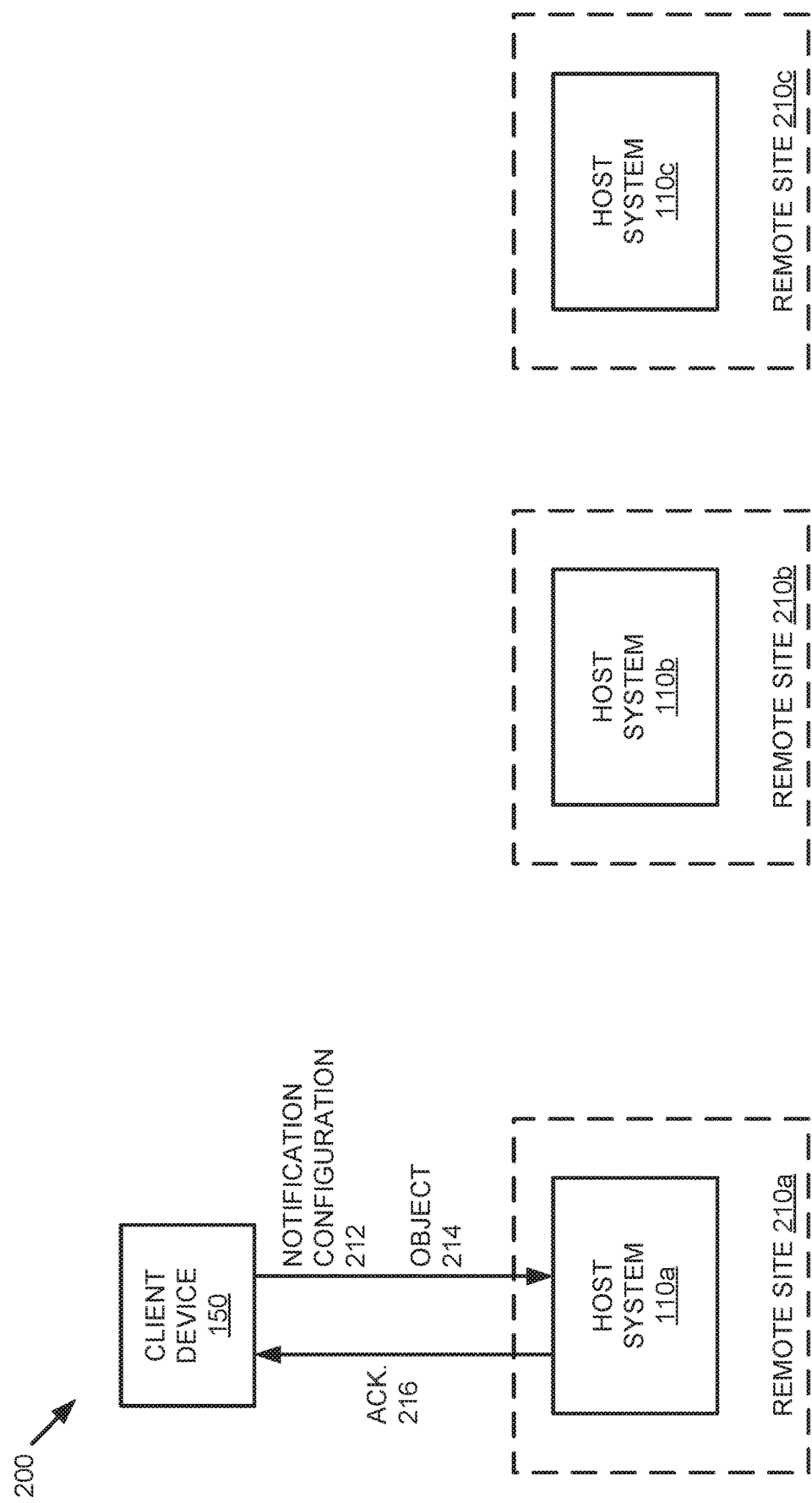
FIG. 2A is an illustration of an example of a geo-replication system receiving a notification configuration from a client device, in accordance with embodiments of the disclosure.

FIG. 2A is an illustration of an example of a geo-replication system 200 receiving a notification configuration from a client device, in accordance with embodiments of the disclosure. The geo-replication system 200 includes a client device 150 and host systems 110a-c, as previously described at FIG. 1. Host systems 110a-c may be located at different remote sites 210a-c, respectively, of geo-replication system 200. In embodiments, each remote site 210a-c may be located at a different geographic location. For example, remote site 210a may be located in San Francisco, remote site 210b may be located in London, and remote site 210c may be located in New York. It should be noted that the components of geo-replication system 200 are shown for illustrative purposes only and embodiments of the geo-replication system 200 may include any number of client devices, host systems, and/or remote sites.

The client device 150 may generate a notification configuration 212 that is to be provided to a host system (e.g., host system 110a ) of geo-replication system 200. The notification configuration 212 may be associated with an object 214 such that the notification configuration 212 is provided to other host systems (e.g., host system 110b and/or host system 110c) of the geo-replication system 200 as object 214 is replicated across the other host systems. In embodiments, the notification configuration 212 may be associated with object 214 by including an identifier of object 214 that may be used by the host systems to identify object 214 when it is received by the host systems and determine that notification configuration 212 is to be used for object 214. In embodiments, the notification configuration 212 may be associated with multiple objects. For example, the notification configuration 212 may be associated with a bucket that includes multiple objects.

In an embodiment, the notification configuration 212 may be associated with one or more parameters of object 214. A parameter may correspond to any property of object 214. For example, a parameter may be timestamp of object 214, an author of object 214, a type of data of object 214, etc.

The notification configuration 212 may cause host systems of the geo-replication system 200 to generate and transmit notification upon storing object 214. In embodiments where the notification configuration 212 is associated with multiple objects, the notification configuration may cause host systems of the geo-replication to generate and transmit notifications upon storing any of the multiple objects.

The notification configuration 212 may include address information indicating where the notification is to be transmitted to. For example, the notification configuration 212 may include an IP address of client device 150, indicating that the host systems are to transmit the notifications to the IP address of the client device 150. In an embodiment, the notification configuration 212 may include address information for multiple recipients of the notifications. For example, the notification configuration may include IP addresses for multiple client devices that the notifications are to be transmitted to.

In embodiments, the notification configuration 212 may cause the host systems to transmit other information associated with the host systems and/or the object. In an embodiment, the notification configuration 212 may cause the host system to transmit a notification that indicates that the object stored at the host systems is stable and is resilient against certain hardware and/or power failures. In embodiments, the notification configuration 212 may cause the host system to include a geographic location that the host system is located in the notification. For example, the notification configuration 212 may cause a host system to transmit a notification that indicates the host system is located in San Francisco. Upon generating the notification configuration 212, the client device 150 may transmit the notification configuration 212 to the host system 110a.

The client device 150 may transmit the object 214 to the host system 110a for storage. Upon receipt of the object 214, the host system 110a may store the object 214 in a memory (e.g., data store 130a) of host system 110a. In embodiments, the host system 110a may store the object 214 in a logical container (e.g., a bucket) at the memory of host system 110a. In some embodiments, host system 110a may store copies of the object at other host systems of remote site 210a to provide data redundancy locally at remote site 210a.

The host system 110a may provide an acknowledgment 216 to the client device 150 when the object 214 has been stored in the memory of the host system 110a. The acknowledgment 216 may indicate to the client device 150 that the object 214 has been successfully stored at the host system 110a.

Figure 2B:
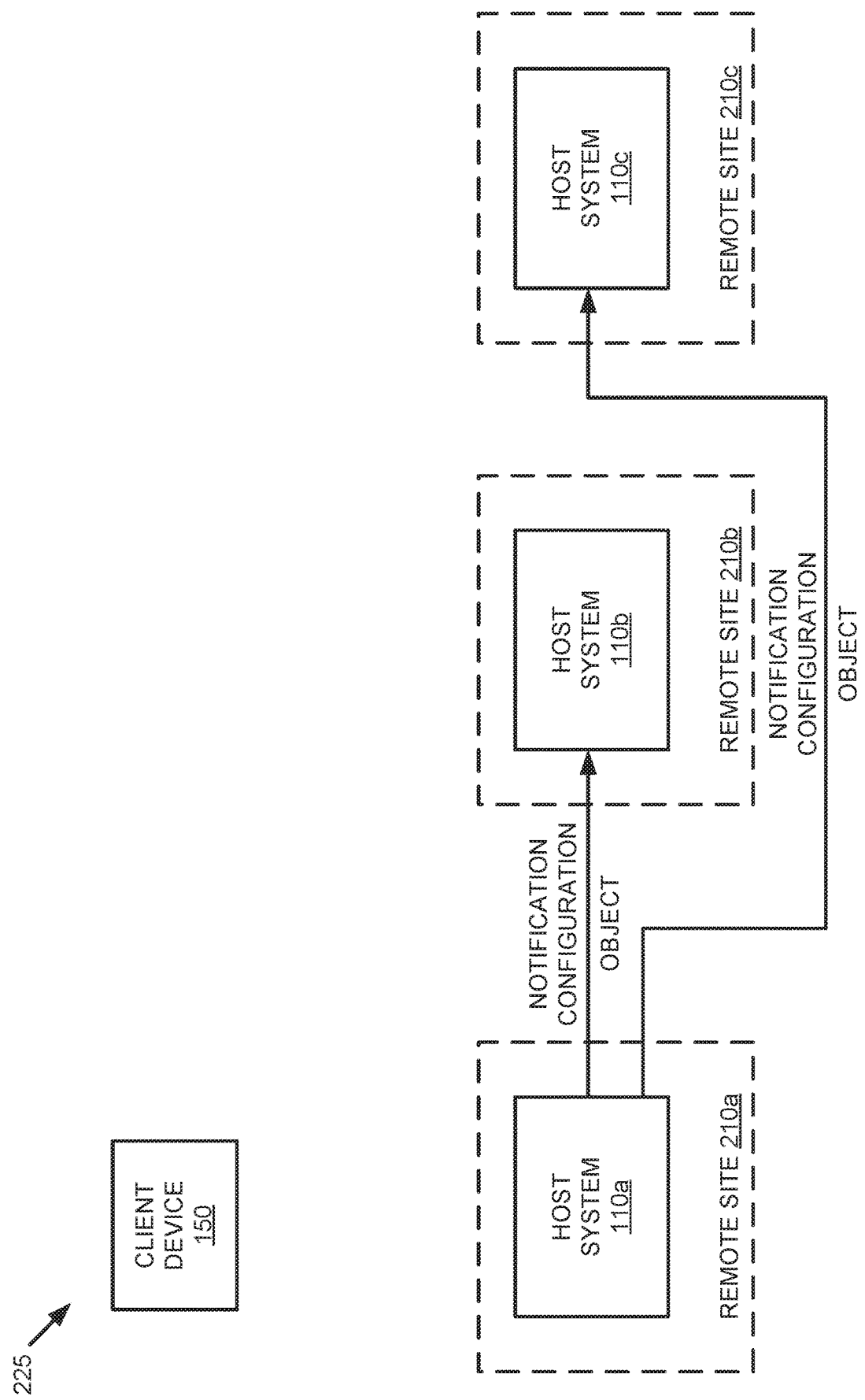
FIG. 2B is an illustration of an example of a host system of a geo-replication system replicating an object at other host systems, in accordance with embodiments of the disclosure.

FIG. 2B is an illustration of an example of a host system of a geo-replication system 225 replicating an object at other host systems, in accordance with embodiments of the disclosure. Upon storing the object (e.g., object 214) at host system 110a, the host system 110a may provide the object and the notification configuration (e.g., notification configuration 212) to host system 110b and/or host system 110c to replicate the object at other remote sites (e.g., remote site 210b and/or remote site 210c) of the geo-replication system 225.

The host system 110a may transmit the notification configuration either separately or in conjunction with the object to host system 110b and/or host system 110c. Upon receipt of the object, host system 110b and/or host system 110c may store the object in a corresponding memory (e.g., data store 130). As previously described, the notification configuration will cause host system 110b and/or host system 110c to generate and transmit the notification to client device 150 upon storing the object in the corresponding memory of host system 110b and/or host system 110c.

Figure 2C:
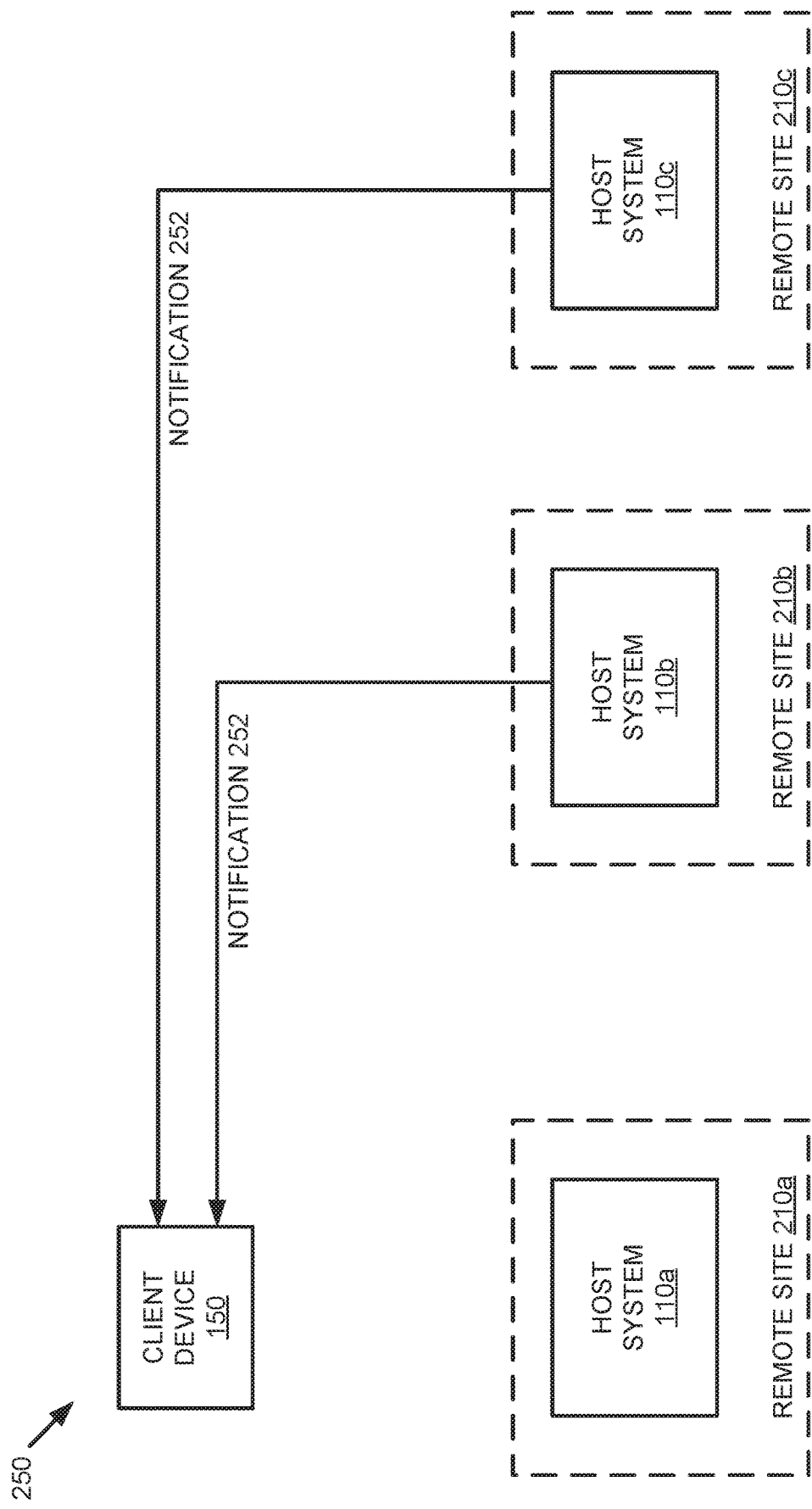
FIG. 2C is an illustration of an example of other host systems of a geo-replication system transmitting notifications to a client device, in accordance with embodiments of the disclosure.

FIG. 2C is an illustration of an example of other host systems of a geo-replication system 250 transmitting notifications to a client device, in accordance with embodiments of the disclosure. Upon storing the object at the corresponding memories, host system 110b and host system 110c may generate notifications 252 that are to be provided to client device 150. In embodiments, the information included in the notification 252 may be determined based on notification configuration. For example, the notification configuration may indicate that the notification 252 is to include a geographic location of the host system and/or whether the object is stable at the host system. Accordingly, host system 110b and host system 110c may generate notifications that include the corresponding geographic locations of host system 110b and host system 110c and indicate whether the object is stored and stable.

Upon generating the notifications, host system 110b and host system 110c may transmit the notification to client device 150 based on the address information included in the notification configuration. In embodiments, host system 110b and host system 110c may transmit the notification to multiple client devices, as previously described.

Figure 3:
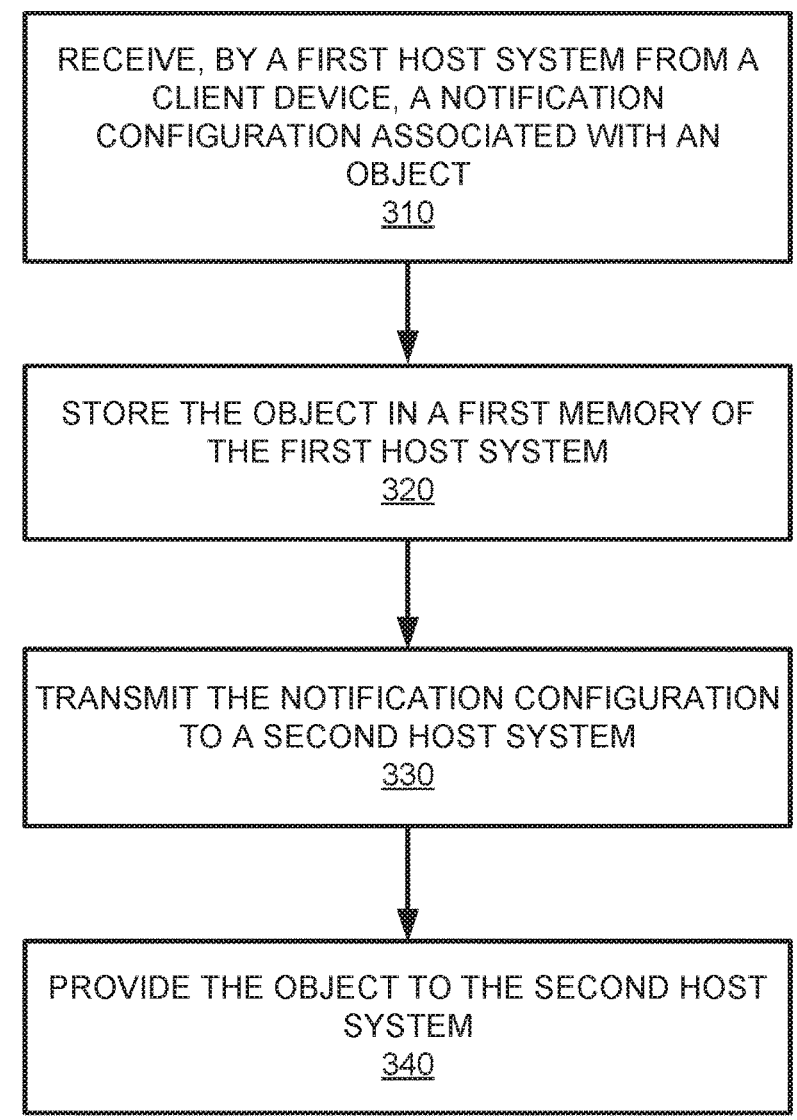
FIG. 3 is a flow diagram of a method of a host system providing a client generated notification configuration associated with an object to a second host system, in accordance with some embodiments.

FIG. 3 is a flow diagram of a method 300 of a host system providing a client generated notification configuration associated with an object to a second host system, in accordance with some embodiments. Method 300 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 300 may be performed by notification transmission component 127a-n of FIG. 1.

With reference to FIG. 3, method 300 illustrates example functions used by various embodiments. Although specific function blocks ("blocks") are disclosed in method 300, such blocks are examples. That is, embodiments are well suited to performing various other blocks or variations of the blocks recited in method 300. It is appreciated that the blocks in method 300 may be performed in an order different than presented, and that not all of the blocks in method 300 may be performed.

Method 300 begins at block 310, where the processing logic receives, by a first host system from a client device, a notification configuration associated with an object. The notification configuration may cause host systems to generate notifications for the client device upon storing the object at the host systems, as previously described.

At block 320, the processing logic stores the object in a first memory of the first host system.

At block 330, the processing logic transmits the notification configuration to a second host system. In embodiments, the second host system may be a host system located at a different remote site and/or geographic location than the first host system.

At block 340, the processing logic provides the object to the second host system. Providing the object to the second host system may cause the second host system to store the object in a second memory of the second host system. Upon storing the object, the second host system is to transmit a notification to the client device that indicates the object is stored at the second host system, as previously described.

Figure 4:
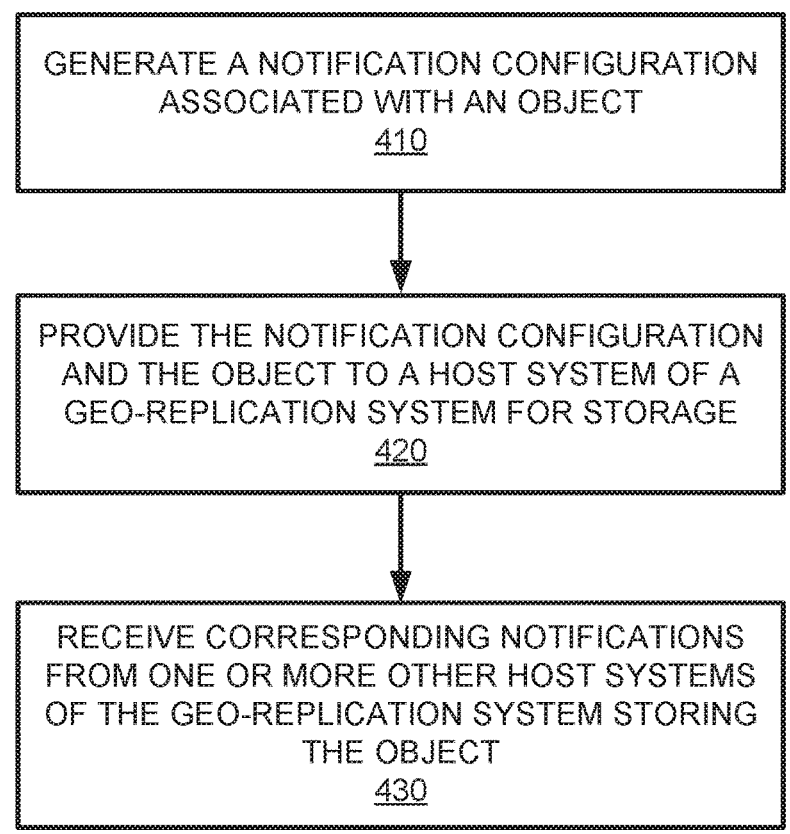
FIG. 4 is a flow diagram of a method of a client device providing a notification configuration to a host system, in accordance with some embodiments.

FIG. 4 is a flow diagram of a method 400 of a client device providing a notification configuration to a host system, in accordance with some embodiments. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 400 may be performed by configuration generation component 167 of FIG. 1.

With reference to FIG. 4, method 400 illustrates example functions used by various embodiments. Although specific function blocks ("blocks") are disclosed in method 400, such blocks are examples. That is, embodiments are well suited to performing various other blocks or variations of the blocks recited in method 400. It is appreciated that the blocks in method 400 may be performed in an order different than presented, and that not all of the blocks in method 400 may be performed.

Method 400 begins at block 410, where the processing logic generates a notification configuration associated with an object. In embodiments, the notification configuration may cause host systems of a geo-replication system to transmit notifications to the client device that generated the notification configuration, as previously described. In some embodiments, the notification configuration may cause host systems to transmit the notifications to one or more different client devices.

At block 420, the processing logic provides the notification configuration and the object to a host system of the geo-replication system. Providing the notification configuration and the object to the host system may cause the host system to provide the notification configuration and the object to one or more other host systems of the geo-replication system for storage.

At block 430, the processing logic receives corresponding notifications from the one or more other host systems of the geo-replication system storing the object.

Figure 5:
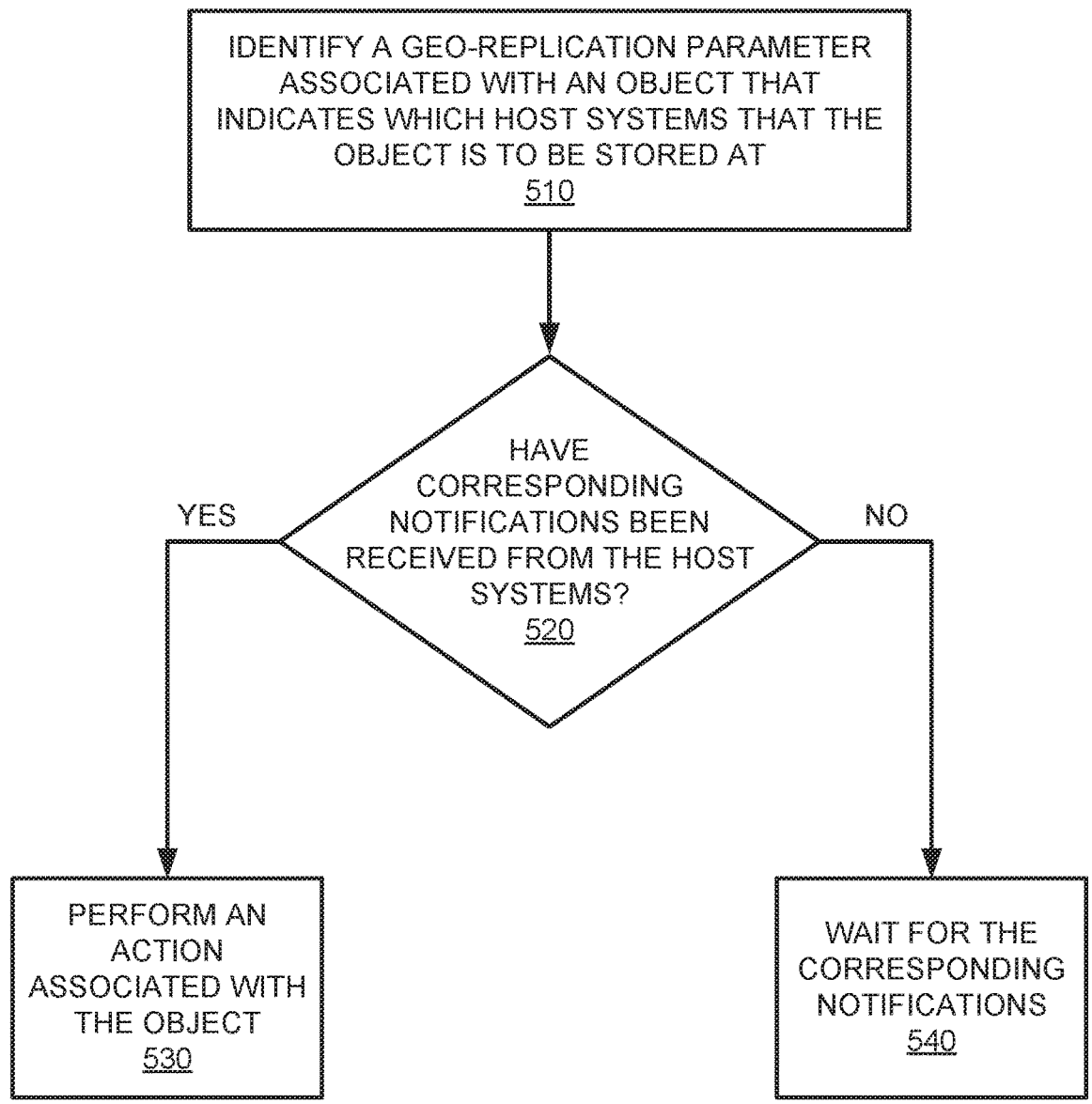
FIG. 5 is a flow diagram of a method of a client device monitoring notifications received from host systems of a geo-replication system, in accordance with some embodiments.

FIG. 5 is a flow diagram of a method 500 of a client device monitoring notifications received from host systems of a geo-replication system, in accordance with some embodiments. Method 500 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 500 may be performed by processing device 160 of client device 150 of FIG. 1.

With reference to FIG. 5, method 500 illustrates example functions used by various embodiments. Although specific function blocks ("blocks") are disclosed in method 500, such blocks are examples. That is, embodiments are well suited to performing various other blocks or variations of the blocks recited in method 500. It is appreciated that the blocks in method 500 may be performed in an order different than presented, and that not all of the blocks in method 500 may be performed.

Method 500 begins at block 510, where the processing logic identifies a geo-replication parameter associated with an object that indicates host systems that the object is to be stored at. In an embodiment, the geo-replication parameters may be stored at a memory of a client device, as previously described at FIG. 1, without transmitting the geo-replication parameters to host systems of a geo-replication system. In embodiments, a geo-replication parameter may include one or more parameters, requirements, etc. that are associated with the replication of the object by a geo-replication system. In embodiments, the geo-replication parameter may indicate that the object is to be stored at a number of host systems and/or remote sites of the geo-replication system. For example, the geo-replication parameter may indicate that the object is to be stored at two or more remote sites of a geo-replication system.

In an embodiment, the geo-replication parameter may indicate that the object is to be stored at a particular remote site and/or geographic location. For example, the geo-replication parameter may indicate that the object is to be stored at a remote site located in San Francisco. In some embodiments, the geo-replication parameter may indicate that the object is to be stored at a remote site within a distance of a geographic location. For example, the geo-replication parameter may indicate that the object is to be stored at a remote site that is within 100 miles of New York.

In embodiments, the geo-replication parameter may include one or more priority levels that are assigned to different host systems and/or remote sites of the geo-replication system. For example, a geo-replication parameter may assign a priority level "1" to a host system/remote site to indicate that storage of the object at the host system/remote site is required and a priority level "2" to another host system/remote site to indicate that storage of the object at the other host system/remote site is optional. In embodiments, the geo-replication parameter may indicate a number host systems/remote sites that the object is to be stored at for each of the priority levels. For example, a geo-replication parameter may indicate that the object is to be stored at all host systems/remote sites having a priority level "1" and at least one host system/remote site having a priority level "2".

At block 520, the processing logic determines if corresponding notifications have been received from the host systems indicated in the geo-replication parameter. For example, if the geo-replication parameter indicates that the object is to be stored at two or more remote sites, then the processing logic may determine if notifications have been received from two or more remote sites. In another example, if the geo-replication parameter indicates that the object is to be stored within 100 miles of New York, then the processing logic may determine if a notification has been received from a remote site that is within 100 miles of New York.

If the corresponding notifications have been received from the host systems indicated in the geo-replication parameter, at block 530 the processing logic performs an action associated with an object. In some embodiments, an action associated with the object may be performing or completing a transaction that utilizes the object. In an embodiment, an action associated with the object may be performing an analytical computation that utilizes the object. In embodiments, an action associated with the object may be a sequential operation that utilizes the object.

In embodiments, the geographic location indicated in the geo-replication parameter may be based on a location associated with the action performed at block 530. For example, if the action is completing a transaction that utilizes the object and the transaction is to take place in Dallas, then the geo-replication parameter may indicate that the object is to be stored at a remote site in Dallas or a remote site within 100 miles of Dallas.

In some embodiments, the object may correspond to intermediate results data from analytic workloads and the action may correspond to performing analytics or computations using the intermediate results data. For example, when using the intermediate results data to perform analytics, a client device may not need to wait for complete consistency between multiple replicas of the intermediate results data and can instead reload and use this temporal data in the ongoing computations/analysis. Accordingly, the geo-replication parameters for intermediate results data may indicate a number of host systems/remote sites that the intermediate results data is to be replicated at before the client device performs analytics and/or computations using the intermediate results data.

If the corresponding notifications have not been received from the host systems indicated in the geo-replication parameter, at block 540 the processing logic waits for the corresponding notifications to be received.

FIG. 6 is an illustration of an example of a geo-replication system 600 utilizing a message broker to distribute notifications, in accordance with embodiments of the disclosure. The geo-replication system 600 may include similar components and operations to those previously described at FIGS. 2A-C. However, the geo-replication system 600 utilizes a message broker 610 to distribute notifications to client device 150, rather than host system 110b and host system 110c transmitting the notifications directly to the client device 150. Accordingly, the notification configuration generated by client device 150 may include the address information for message broker 610, rather than the address information for client device 150. This may cause host system 110b and/or host system 110c to transmit the notifications to the message broker 610 upon storing the object, rather than the client device 150.

The message broker 610 may act as an intermediary component that mediates communications between applications. In embodiments, the message broker 610 may be executed by processing logic of computing device (not shown) that is separate from client device 150 and host systems 110a-c. In an embodiment, the message broker 610 may be executed by processing logic of a host system of geo-replication system 600. Client devices, such as client device 150, may transmit a subscription 615 for notifications associated with an object to the message broker 610. As notifications associated with the object are received from various host systems of the geo-replication system 600, the message broker 610 may transmit the notifications to the client devices that have subscribed for notifications associated with the object. The use of a message broker 610 to distribute the notification may allow for easy addition or removal of client devices that are to receive notifications associated with an object without having to modify the notification configuration (e.g., modifying the address information for the client device(s)) associated with the object.

FIG. 7 is a flow diagram of a method 700 of a host system distributing a client generated notification configuration utilizing a message broker to a second host system, in accordance with some embodiments. Method 700 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 700 may be performed by notification transmission component 127a-n of FIG. 1.

With reference to FIG. 7, method 700 illustrates example functions used by various embodiments. Although specific function blocks ("blocks") are disclosed in method 700, such blocks are examples. That is, embodiments are well suited to performing various other blocks or variations of the blocks recited in method 700. It is appreciated that the blocks in method 700 may be performed in an order different than presented, and that not all of the blocks in method 700 may be performed.

Method 700 begins at block 710, where the processing logic of a first host system receives an object and a notification configuration associated with the object. The notification configuration may cause host systems of a geo-replication system to transmit notifications to a message broker upon storing the object at the host systems, as previously described.

At block 720, the processing logic transmits the object and the notification configuration to a second host system of the geo-replication system. Upon receipt of the object and the notification configuration, the second host system is to store the object and transmit a notification to the message broker.

Figure 8:
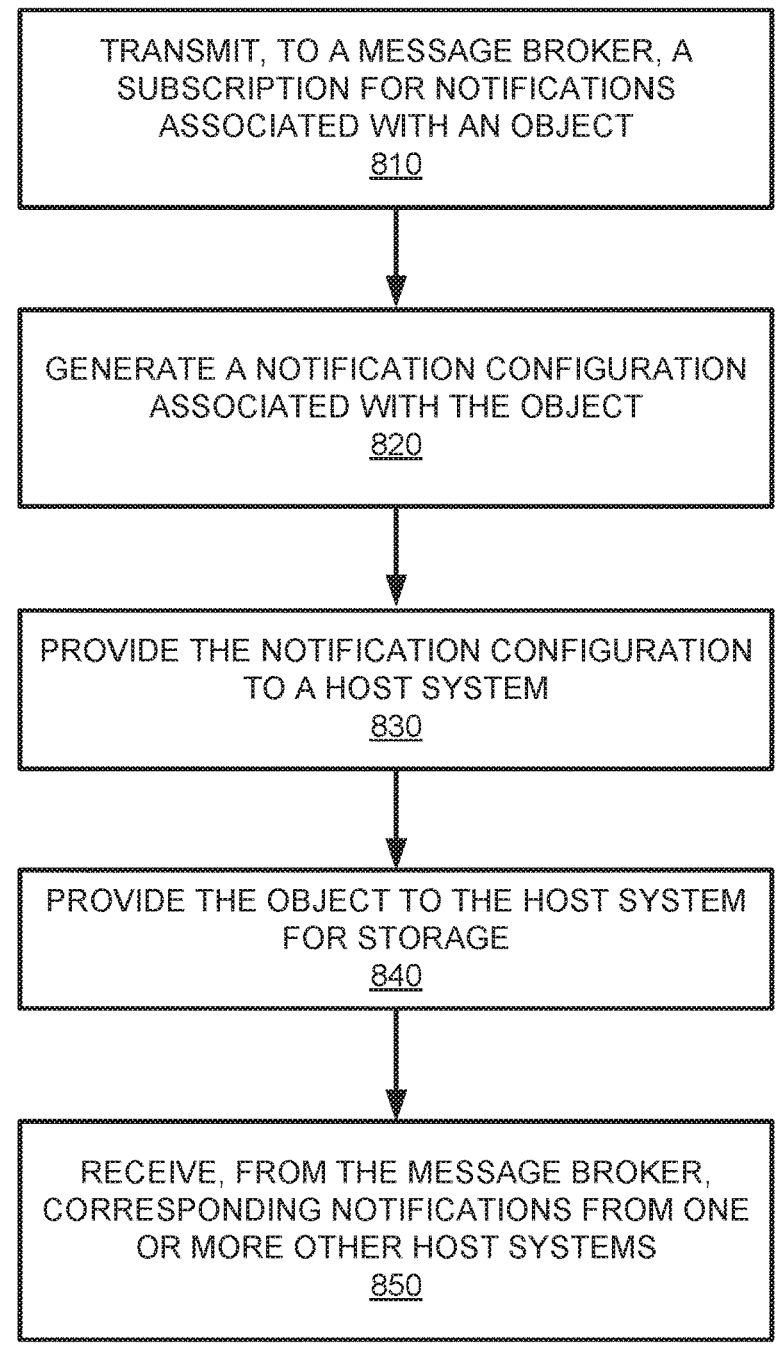
FIG. 8 is a flow diagram of a method of a client device monitoring notifications received from a geo-replication system via a message broker, in accordance with some embodiments.

FIG. 8 is a flow diagram of a method 800 of a client device monitoring notifications received from a geo-replication system via a message broker, in accordance with some embodiments. Method 800 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 800 may be performed by processing device 160 of FIG. 1.

With reference to FIG. 8, method 800 illustrates example functions used by various embodiments. Although specific function blocks ("blocks") are disclosed in method 800, such blocks are examples. That is, embodiments are well suited to performing various other blocks or variations of the blocks recited in method 800. It is appreciated that the blocks in method 800 may be performed in an order different than presented, and that not all of the blocks in method 800 may be performed.

Method 800 begins at block 810, where the processing logic transmits, to a message broker, a subscription for notifications associated with an object.

At block 820, the processing logic generates a notification configuration associated with the object. The notification configuration may include address information for the message broker. The notification configuration may cause host systems of a geo-replication system to transmit notifications to the message broker upon storing the object, as previously described.

At block 830, the processing logic provides the notification configuration to a host system.

At block 840, the processing logic provides the object to the host system for storage. Upon storing the object, the host system may distribute the object and the notification configuration to one or more other host systems of the geo-replication system to replicate the object, as previously described.

At block 850, the processing logic receives, from the message broker, corresponding notifications from the one or more other host systems of the geo-replication system.

Figure 9:
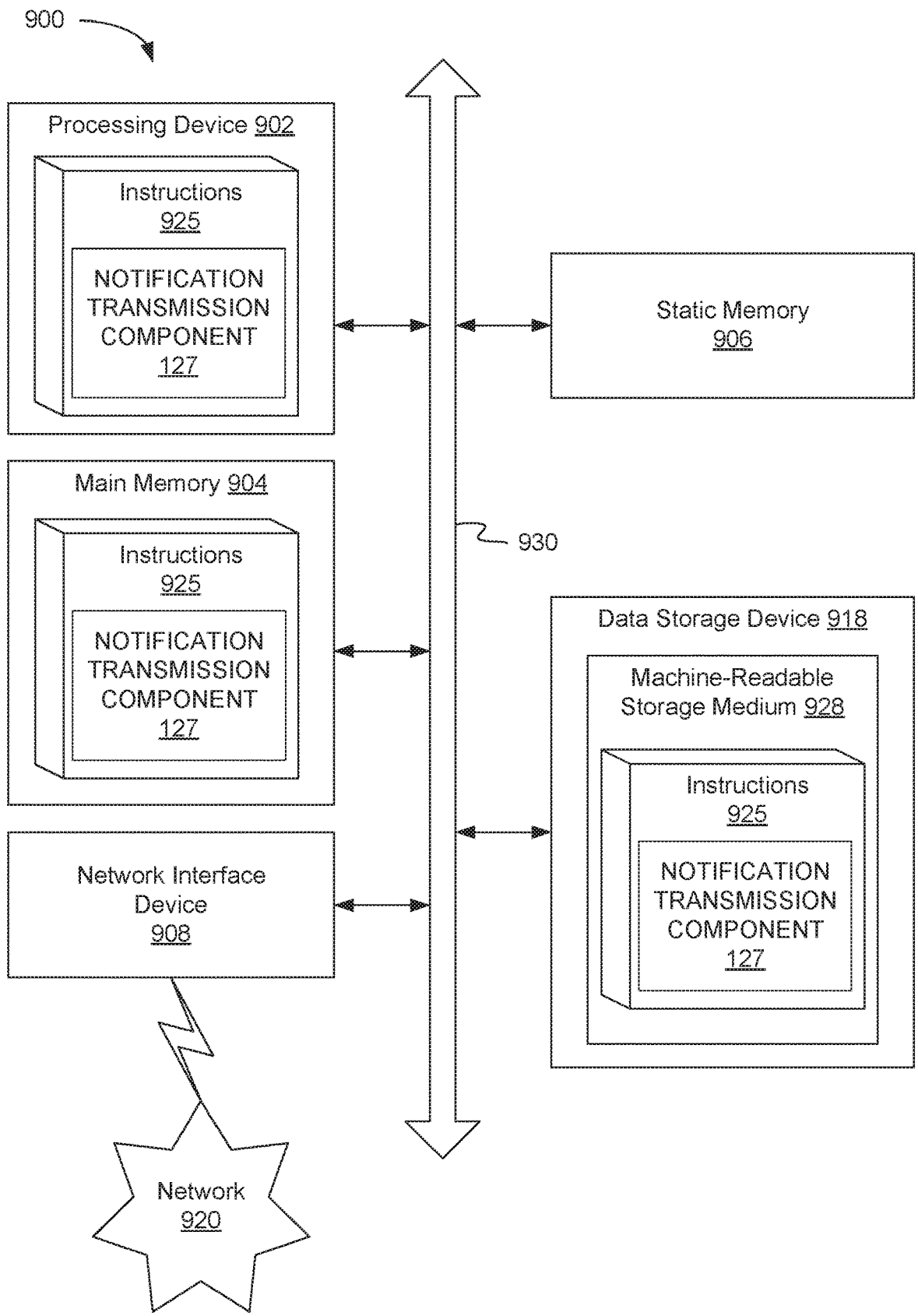
FIG. 9 is a block diagram of an example apparatus that may perform one or more of the operations described herein, in accordance with some embodiments of the present disclosure.

FIG. 9 is a block diagram of an example computing device 900 that may perform one or more of the operations described herein, in accordance with some embodiments. Computing device 900 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 900 may include a processing device (e.g., a general purpose processor, a PLD, etc.) 902, a main memory 904 (e.g., synchronous dynamic random access memory (DRAM), read-only memory (ROM)), a static memory 906 (e.g., flash memory and a data storage device 918), which may communicate with each other via a bus 930.

Processing device 902 may be provided by one or more general-purpose processing devices such as a microprocessor, central processing unit, or the like. In an illustrative example, processing device 902 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 902 may also comprise one or more special-purpose processing devices such as an application specific integrated circuit (ASIC), a field programmable gate array (FPGA), a digital signal processor (DSP), network processor, or the like. The processing device 902 may be configured to execute the operations described herein, in accordance with one or more aspects of the present disclosure, for performing the operations and steps discussed herein.

Computing device 900 may further include a network interface device 908 which may communicate with a network 920. The computing device 900 also may include a video display unit 910 (e.g., a liquid crystal display (LCD) or a cathode ray tube (CRT)), an alphanumeric input device 912 (e.g., a keyboard), a cursor control device 914 (e.g., a mouse) and an acoustic signal generation device 916 (e.g., a speaker). In one embodiment, video display unit 910, alphanumeric input device 912, and cursor control device 914 may be combined into a single component or device (e.g., an LCD touch screen).

Data storage device 918 may include a computer-readable storage medium 928 on which may be stored one or more sets of instructions 925 that may include instructions for a notification transmission component, e.g., notification transmission component 127 and/or a configuration generation component, e.g., configuration generation component 167 for carrying out the operations described herein, in accordance with one or more aspects of the present disclosure.

Instructions 925 may also reside, completely or at least partially, within main memory 904 and/or within processing device 902 during execution thereof by computing device 900, main memory 904 and processing device 902 also constituting computer-readable media. The instructions 925 may further be transmitted or received over a network 920 via network interface device 908.

While computer-readable storage medium 928 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Example 1 is a method comprising receiving, by a first host system from a client device, a notification configuration associated with an object, wherein the notification configuration causes host systems to generate notifications for the client device upon storing the object at the host systems; storing the object in a first memory of the first host system; transmitting, by a processing device of the first host system, the notification configuration to a second host system; and providing the object to the second host system, wherein the second host system is to transmit a notification to the client device upon storing the object at a second memory of the second host system.

Example 2 is the method of Example 1, wherein the object comprises intermediate results data from an analytic workload.

Example 3 is the method of Example 1 or Example 2, wherein the first host system is located at a first remote site and wherein the second host system is located at a second remote site that is different than the first remote site.

Example 4 is the method of Example 1, Example 2, or Example 3, wherein the notification comprises a geographic location of the second remote site of the second host system.

Example 5 is the method of Example 1, Example 2, Example 3, or Example 4, wherein the notification indicates that the object stored at the second memory of the second host system is stable.

Example 6 is the method of Example 1, Example 2, Example 3, Example 4, or Example 5, wherein the notification configuration is associated with at least one of a bucket storing the object, an identifier of the object, or a parameter associated with the object.

Example 7 is the method of Example 1, Example 2, Example 3, Example 4, Example 5, or Example 6, wherein the third host system is located at a third remote site.

Example 8 is the method of Example 1, Example 2, Example 3, Example 4, Example 5, Example 6, or Example 7, wherein the object is stored at a first bucket in the first memory of the first host system and a second bucket in the second memory of the second host system.

Example 9 is an apparatus comprising a memory; and a processing device, operatively coupled to the memory, to generate a notification configuration associated with an object, wherein the notification configuration causes host systems of a geo-replication system to transmit notifications to the apparatus when the object is stored at the host systems; provide the notification configuration and the object to a host system of the geo-replication system for storage, wherein providing the notification configuration and the object to the host system causes the host system to provide the notification configuration and the object to one or more other host systems of the geo-replication system for storage; and receive corresponding notifications from the one or more other host systems of the geo-replication system storing the object.

Example 10 is the apparatus of Example 9, wherein the processing device is further to identify a geo-replication parameter associated with the object, wherein the geo-replication parameter indicates which of the one or more other host systems that the object is to be stored at; determine whether corresponding notifications has been received from the one or more other host systems indicated by the geo-replication parameter; and in response to determining that the corresponding notifications have been received, perform an action associated with the object.

Example 11 is the apparatus of Example 9 or Example 10, wherein the action associated with the object comprises completing a transaction associated with the object or performing a sequential operation associated with the object.

Example 12 is the apparatus of Example 9, Example 10, or Example 11, wherein the geo-replication parameter comprises one or more priority levels assigned to the one or more other host systems of the geo-replication system.

Example 13 is the apparatus of Example 9, Example 10, Example 11, or Example 12, wherein the corresponding notifications comprise corresponding geographic locations of the one or more other host systems of the geo-replication system.

Example 14 is the apparatus of Example 9, Example 10, Example 11, Example 12, or Example 13, wherein the notification configuration comprises address information associated with the apparatus.

Example 15 is the apparatus of Example 9, Example 10, Example 11, Example 12, Example 13, or Example 14, wherein the notification configuration is associated with at least one of a bucket storing the object, an identifier of the object, or a parameter associated with the object.

Example 16 is a non-transitory computer-readable storage medium including instructions that, when executed by a processing device of a first host system, cause the processing device to receive, by the first host system, an object and a notification configuration associated with the object, wherein the notification configuration causes host systems of a geo-replication system to transmit notifications to a message broker upon storing the object at the host systems; and transmit, by the processing device, the object and the notification configuration to a second host system, wherein the second host system is to transmit a notification to the message broker upon storing the object.

Example 17 is the non-transitory computer-readable storage medium of Example 16, wherein the processing device is further to provide an acknowledgment to a client device associated with the object indicating that the object is stored at the first host system.

Example 18 is the non-transitory computer-readable storage medium of Example 16 or Example 17, wherein the first host system is located at a first remote site and wherein the second host system is located at a second remote site that is different than the first remote site.

Example 19 is the non-transitory computer-readable storage medium of Example 16, Example 17, or Example 18, wherein the notification comprises a geographic location of the second remote site of the second host system.

Example 20 is the non-transitory computer-readable storage medium of Example 16, Example 17, Example 18, or Example 19, wherein the notification indicates that the object stored at the second host system is stable.

Example 21 is the non-transitory computer-readable storage medium of Example 16, Example 17, Example 18, Example 19, or Example 20, wherein the processing device is further to transmit the object and the notification configuration to a third host system, wherein the third host system is to transmit a second notification to the message broker upon storing the object.

Example 22 is the non-transitory computer-readable storage medium of Example 16, Example 17, Example 18, Example 19, Example 20, or Example 21, wherein the third host system is located at a third remote site.

Example 23 is a method comprising transmitting, to a message broker, a subscription for notifications associated with an object; generating, by a processing device, a notification configuration associated with the object, wherein the notification configuration causes host systems to transmit notifications to the message broker when the object is stored at the host systems; providing the notification configuration to a host system; provide the object to a host system for storage, wherein providing the object to the host system causes the host system to provide the notification configuration and the object to one or more other host systems; and receiving, from the message broker, corresponding notifications from the one or more other host systems.

Example 24 is the method of Example 23, further comprising identifying a geo-replication parameter associated with the object, wherein the geo-replication parameter indicates a particular host system of the one or more other host systems that the object is to be stored at; determining whether a corresponding notification has been received from the particular host system indicated by the geo-replication parameter; and in response to determining that the corresponding notification has been received, performing an action associated with the object.

Example 25 is the method of Example 23 or Example 24, wherein the action associated with the object comprises completing a transaction associated with the object or performing a sequential operation associated with the object.

Example 26 is the method of Example 23, Example 24, or Example 25, wherein the geo-replication parameter comprises one or more priority levels assigned to the one or more other host systems.

Example 27 is the method of Example 23, Example 24, Example 25, or Example 26, wherein the corresponding notifications comprise corresponding geographic locations of the one or more other host systems.

Example 28 is the method of Example 23, Example 24, Example 25, Example 26, or Example 27, wherein the notification configuration comprises address information associated with the message broker.

Example 29 is an apparatus comprising means for receiving, by a first host system from a client device, a notification configuration associated with an object, wherein the notification configuration causes host systems to generate notifications for the client device upon storing the object at the host systems; means for storing the object in a first memory of the first host system; means for transmitting, by the first host system, the notification configuration to a second host system; and means for providing the object to the second host system, wherein the second host system is to transmit a notification to the client device upon storing the object at a second memory of the second host system.

Example 30 is the apparatus of Example 29, wherein the means for storing the object in the first memory of the first host system further comprises means for providing an acknowledgment to the client device indicating that the object is stored in the first memory of the first host system.

Example 31 is the apparatus of Example 29 or Example 30, wherein the first host system is located at a first remote site and wherein the second host system is located at a second remote site that is different than the first remote site.

Example 32 is the apparatus of Example 29, Example 30, or Example 31, wherein the notification comprises a geographic location of the second remote site of the second host system.

Example 33 is the apparatus of Example 29, Example 30, Example 31, or Example 32, wherein the notification indicates that the object stored at the second memory of the second host system is stable.

Example 34 is the apparatus of Example 29, Example 30, Example 31, Example 32, or Example 33, wherein the notification configuration is associated with at least one of a bucket storing the object, an identifier of the object, or a parameter associated with the object.

Example 35 is the apparatus of Example 29, Example 30, Example 31, Example 32, Example 33, or Example 34, wherein the third host system is located at a third remote site.

Example 35 is the apparatus of Example 29, Example 30, Example 31, Example 32, Example 33, Example 34, or Example 35, wherein the object is stored at a first bucket in the first memory of the first host system and a second bucket in the second memory of the second host system.

Unless specifically stated otherwise, terms such as "receiving," "routing," "updating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
receiving, by a first host system from a client device, a notification configuration associated with an object, wherein the notification configuration causes host systems to generate notifications for the client device upon storing the object at the host systems;
storing the object in a first memory of the first host system;
transmitting, by a processing device of the first host system, the notification configuration to a second host system; and
providing the object to the second host system, wherein the second host system is to transmit a notification to the client device upon storing the object at a second memory of the second host system.

2. The method of claim 1, wherein the object comprises intermediate results data from an analytic workload.

3. The method of claim 1, wherein the first host system is located at a first remote site and wherein the second host system is located at a second remote site that is different than the first remote site.

4. The method of claim 3, wherein the notification comprises a geographic location of the second remote site of the second host system.

5. The method of claim 1, wherein the notification indicates that the object stored at the second memory of the second host system is stable.

6. The method of claim 1, wherein the notification configuration is associated with at least one of a bucket storing the object, an identifier of the object, or a parameter associated with the object.

7. The method of claim 6, wherein the third host system is located at a third remote site.

8. The method of claim 1, wherein the object is stored at a first bucket in the first memory of the first host system and a second bucket in the second memory of the second host system.

9. An apparatus comprising:
a memory; and
a processing device, operatively coupled to the memory, to:
generate a notification configuration associated with an object, wherein the notification configuration causes host systems of a geo-replication system to transmit notifications to the apparatus when the object is stored at the host systems;
provide the notification configuration and the object to a host system of the geo-replication system for storage, wherein providing the notification configuration and the object to the host system causes the host system to provide the notification configuration and the object to one or more other host systems of the geo-replication system for storage; and
receive corresponding notifications from the one or more other host systems of the geo-replication system storing the object.

10. The apparatus of claim 9, wherein the processing device is further to:
identify a geo-replication parameter associated with the object, wherein the geo-replication parameter indicates which of the one or more other host systems that the object is to be stored at;
determine whether corresponding notifications has been received from the one or more other host systems indicated by the geo-replication parameter; and
in response to determining that the corresponding notifications have been received, perform an action associated with the object.

11. The apparatus of claim 10, wherein the action associated with the object comprises completing a transaction associated with the object or performing a sequential operation associated with the object.

12. The apparatus of claim 10, wherein the geo-replication parameter comprises one or more priority levels assigned to the one or more other host systems of the geo-replication system.

13. The apparatus of claim 9, wherein the corresponding notifications comprise corresponding geographic locations of the one or more other host systems of the geo-replication system.

14. The apparatus of claim 9, wherein the notification configuration comprises address information associated with the apparatus.

15. The apparatus of claim 9, wherein the notification configuration is associated with at least one of a bucket storing the object, an identifier of the object, or a parameter associated with the object.

16. A non-transitory computer-readable storage medium including instructions that, when executed by a processing device of a first host system, cause the processing device to:
receive, by the first host system, an object and a notification configuration associated with the object, wherein the notification configuration causes host systems of a geo-replication system to transmit notifications to a message broker upon storing the object at the host systems; and
transmit, by the processing device, the object and the notification configuration to a second host system, wherein the second host system is to transmit a notification to the message broker upon storing the object.

17. The non-transitory computer-readable storage medium of claim 16, wherein the processing device is further to:
provide an acknowledgment to a client device associated with the object indicating that the object is stored at the first host system.

18. The non-transitory computer-readable storage medium of claim 16, wherein the first host system is located at a first remote site and wherein the second host system is located at a second remote site that is different than the first remote site.

19. The non-transitory computer-readable storage medium of claim 18, wherein the notification comprises a geographic location of the second remote site of the second host system.

20. The non-transitory computer-readable storage medium of claim 16, wherein the notification indicates that the object stored at the second host system is stable.

* * * * *